United States Patent [19]

Nishikawa et al.

[11] Patent Number: 5,053,289
[45] Date of Patent: Oct. 1, 1991

[54] MAGNETIC RECORDING MEDIUM

[75] Inventors: Yasuo Nishikawa; Takashi Yoneyama; Kunihiko Sano, all of Kanagawa, Japan

[73] Assignee: Fuji Photo Film Co., Ltd., Kanagawa, Japan

[21] Appl. No.: 330,009

[22] Filed: Mar. 29, 1989

[30] Foreign Application Priority Data

Mar. 29, 1988 [JP] Japan .................................. 63-73356

[51] Int. Cl.$^5$ .............................................. G11B 23/00
[52] U.S. Cl. .................................... 428/694; 428/695; 428/900
[58] Field of Search ........................ 428/695, 694, 900

[56] References Cited

U.S. PATENT DOCUMENTS

| | | | |
|---|---|---|---|
| 4,741,959 | 5/1988 | Abe et al. | 428/425.9 |
| 4,758,471 | 7/1988 | Arioka et al. | 428/694 |
| 4,772,522 | 9/1988 | Kubota et al. | 428/694 |

Primary Examiner—Paul J. Thibodeau
Attorney, Agent, or Firm—Sughrue, Mion, Zinn, Macpeak & Seas

[57] ABSTRACT

A magnetic recording medium comprising a nonmagnetic support having thereon a magnetic layer, wherein an ester compound obtained by condensing a saturated fatty acid having from 6 to 26 carbon atoms and an unsaturated alcohol having from 8 to 26 carbon atoms is present on or in the magnetic layer.

7 Claims, No Drawings

000
MAGNETIC RECORDING MEDIUM

FIELD OF THE INVENTION

This invention relates to a magnetic recording medium comprising a non-magnetic support having thereon either a magnetic layer comprising ferromagnetic particles dispersed in a binder, or a magnetic layer comprising a thin ferromagnetic metal film. More particularly, this invention relates to a magnetic recording medium having excellent running property and durability under wide ranges of temperatures and humidities.

BACKGROUND OF THE INVENTION

Higher density recording has been demanded for a magnetic recording medium. As one approach to meeting this demand, it is known to smoothen the surface of the magnetic layer of such a medium.

However, when the surface of the magnetic layer is made smooth, the friction coefficient, which measures the contact between the magnetic layer and a running system while the magnetic recording medium is running, increases. As a result, the magnetic layer tends to become damaged and/or peel off after only a short period of use.

In order to cope with the above problem, it is known to use lubricating agents such as fatty acid esters (e.g., higher fatty acid esters as disclosed in JP-A-50-22603, JP-A-50-153905, JP-B-39-28367 and JP-B-41-18065; unsaturated fatty acid esters as disclosed in JP-A-55-139637; esters of unsaturated fatty acids as disclosed in JP-A-58-164025; fatty acid esters of unsaturated alcohols as disclosed in JP-B-47-12950); silicon compounds as disclosed in U.S. Pat. No. 2,654,681; fatty acids or hydrocarbons. (The term "JP-A" as used herein means "unexamined Japanese patent application", and the term "JP-B" as used herein means "examined Japanese patent publication").

As another approach to improve running durability, it has been suggested and it has been practiced to add abrasive agents (hard particles) into the magnetic layer.

Recently, with the wide development and use of VTRs, and flexible disk drive apparatuses for word processors and personal computers, magnetic recording media have come to be used under a wide range of conditions, such as at low temperatures and at high temperatures and high humidities. Despite this wide range of conditions, the running durability of the magnetic recording medium should be stable and should not fluctuate. However, conventionally known lubricating agents have been insufficient for maintaining the necessary stability.

When abrasive agents are added into a magnetic layer in order to improve the running durability of the magnetic layer, significant effect are not achieved unless a relatively large amount of the abrasive agents is added. However, it has heretofore been difficult to obtain good running durability without sacrificing electromagnetic characteristics and risking premature head wear-out.

SUMMARY OF THE INVENTION

An object of this invention is to provide a magnetic recording medium having excellent running durability under conditions of wide ranging temperatures and humidities while maintaining excellent electromagnetic characteristics.

Other objects and effects of this inveniton will be apparent from the following description.

The inventors of this invention thoroughly studied lubricating agents to solve the above-described problems which are suffered with both the magnetic particle coated type magnetic recording medium and the thin metal film type magnetic recording medium. As a result of these studies, it has been found, in accordance with the present invention that excellent durability and environmental adaptability can be obtained by using a saturated fatty acid ester of a long chain unsaturated alcohol as a lubricating agent.

The above objects of this invention have been attained by a magnetic recording medium comprising a nonmagnetic support having thereon a magnetic layer, wherein an ester compound obtained by condensing a saturated fatty acid having from 6 to 26 carbon atoms and an unsaturated alcohol having from 8 to 26 carbon atoms is present on or in the magnetic layer.

DETAILED DESCRIPTION OF THE INVENTION

Preferably, the above-described ester compound of this invention has a molecular weight of 430 or more.

The ester compounds which are employed in the present invention are those obtained by condensing a saturated fatty acid having from 6 to 26, preferably from 10 to 24, carbon atoms and an unsaturated alcohol having from 8 to 26, preferably from 10 to 24, carbon atoms. The fatty acid may have isomer structures (branched or linear) and the unsaturated alcohol may have isomerized structures (cis or trans; linear or branched).

Ester compounds having a molecular weight of 430 or more are preferred because they exhibit the effective lubricating function when used in relatively small amount. Ester compounds having a molecular weight of from 500 to 1,000 are more preferred.

Specific non-limiting examples of an ester compound, which can be used in the present invention include erucyl caproate, oleyl caproate, elaidyl caproate, palmitoleyl caproate, undecylenyl caproate, erucyl decanoate, oleyl decanoate, elaidyl decanoate, palmitoleyl decanoate, undecylenyl decanoate, erucyl laurate, oleyl laurate, elaidyl laurate, palmitoleyl laurate, undecylenyl laurate, erucyl myristate, oleyl myristate, elaidyl myristate, palmitoleyl myristate, undecylenyl myristate, erucyl stearate, oleyl stearate, elaidyl stearate, palmitoleyl stearate, undecyleneyl stearate, erucyl behenate, oleyl behenate, elaidyl behenate, palmitoleyl behenate, undecylenyl behenate, erucyl isostearate, oleyl isostearate, elaidyl isostearate, palmitoleyl isostearate, undecylenyl isostearate, erucyl isomyristate, oleyl isomyristate, elaidyl isomyristate, palmitoleyl isomyristate and undecylenyl isomyristate.

Preferred ester compounds are those having a molecular weight of 430 or more such as erucyl caproate, erucyl decanoate, oleyl decanoate, elaidyl decanoate, erucyl laurate, oleyl laurate, elaidyl laurate, palmitoleyl laurate, erucyl myristate, oleyl myristate, elaidyl myristate, palmitoleyl myristate, undecylenyl myristate, erucyl stearate, oleyl stearate, elaidyl stearate, palmitoleyl stearate, undecylenyl stearate, erucyl behenate, oleyl behenate, elaidyl behenate, palmitoleyl behenate, undecylenyl behenate, erucyl isostearate, oleyl isostearate, elaidyl isostearate, palmitoleyl isostearate, undecylenyl isostearate, erucyl isomyristate, oleyl isomyristate, elaidyl isomyristate, palmitoleyl isomyristate and undecylenyl isomyristate.

Further, those ester compounds having a molecular weight of 500 or more and melting point of 36° C. or lower are the most preferred. Specific non-limiting examples of such compounds include oleyl stearate and oleyl isostearate.

When the ester compound of the present invention has a molecular weight of 400 or less, the ester compound is preferably present in the magnetic layer of a coated magnetic recording medium (which comprises a binder and ferromagnetic particles dispersed therein) in an amount of from 1 to 22 wt%, based on the weight of the ferromagnetic particles in the magnetic layer. When the ester compound has a molecular weight of more than 400, the ester compound is preferably present in the magnetic layer of a coated magnetic recording medium an amount of from 1 to 16 wt% based on the weight of the ferromagnetic particles in the magnetic layer. When the ester compound is top-coated on the surface of the magnetic layer of either a coated magnetic recording medium or a thin metal film type magnetic recording medium, the ester compound is preferably present in an amount of from 2 to 50 mg/m$^2$, and more preferably from 2 to 30 mg/m$^2$.

When the amount of ester added exceeds the above ranges, problems such as the following can occur. When too much ester compound is added to the surface of the magnetic layer, stick-slip can due to the superfluous ester present. In the case when too much ester compound is added into the magnetic layer, the ester compound plasticizes the binder of the magnetic layer and durability can be thereby decreased.

When the amount of ester added is below the above ranges, the amount of the ester compound present can be insufficient to attain the object of the present invention.

In this invention, other (i.e., "auxiliary") lubricating agents may be used in combination with the ester compound of the present invention.

The auxiliary lubricating agents which can be used in combination with the ester compound include saturated and unsaturated fatty acids (myristic acid, stearic acid, oleic acid), metal soaps, fatty acid amides, fatty acid esters other than those of this invention ((e.g., fatty acid esters of not only various monoesters but polyhydric esters such as sorbitan or glycerin, and esters of polybasic acids), higher aliphatic alcohols, monoalkylphosphates, dialklylphosphates, trialkylphosphates, paraffins, silicon oils, animal and vegetable oils, mineral oil, higher aliphatic amines, inorganic fine particles (such as graphite, silica, molybdenum disulfide, or tungsten disulfide), resin fine particles (such as polyethylene, polypropylene, polyvinyl chloride, ethylenevinyl chloride copolymer or polytetrafluoroethylene), α-olefin polymers, unsaturated aliphatic hydrocarbons which are liquid at room temperature and fluorocarbons.

The preferred amount of the auxiliary lubricating agents varies depending on the embodiment of the use thereof, but preferably is from 1/10 to 2 times by weight the amount of the ester compound of the present invention.

In a coated magnetic layer medium, the ester compound of the present invention (i.e., the ester obtained by condensing saturated fatty acid having from 6 to 22 carbon atoms and unsaturated alcohol having from 8 to 22 carbon atoms) is included in the magnetic layer or is top-coated on the surface of the magnetic layer. In a thin metal film magnetic recording medium, the ester compound is substantially limited to be top-coated.

Methods for top-coating the ester compound include (1) the method which comprises dissolving the ester compound in an organic solvent, coating or spraying the resulting coating composition and then drying, (2) melting and fusing the ester compound and any starting materials, and then coating the fused compound, (3) dissolving the ester compound in an organic solvent and soaking the material in the resulting coating composition so that the ester is adsorbed on the surface of the material; and (4) the Langmuir-Brodgett method.

In a coated magnetic recording medium of which magnetic layer comprises a binder and ferromagnetic particles dispersed therein, the ferromagnetic particles used are not particularly limited. For example, ferromagnetic alloy particles, $\gamma$-Fe$_2$O$_3$, Fe$_3$O$_4$, Co-modified iron oxide, CoO$_2$, iron nitride, modified barium ferrite and modified strontium ferrite can be used.

The shapes of the ferromagnetic particles are not particularly limited, and acicular, granular, dice-like, rice-grain-like and plate-like particles are generally used. The ferromagnetic particles have a specific surface area of preferably 20 m$^2$/g or higher in light of electromagnetic conversion characteristics.

The binders which form the magnetic layer can be selected from the conventional polymers which are used as binders. Example of such polymers include vinyl chloride/vinyl acetate copolymers; copolymers of vinyl chloride, vinyl acetate, vinyl alcohol and maleic acid and/or acrylic acid; vinyl chloride/vinylidene chloride copolymers; vinyl chloride/acrylonitrile copolymers; ethylene/vinyl acetate copolymers; cellulose derivatives such as nitrocellulose resins; acrylic resins; polyvinyl acetal resins; polyvinyl butyral resins; epoxy resins; phenoxy resins; polyurethane resins; and polycarbonate polyurethane resins.

In order to further improve dispersibility and durability, it is preferred to introduce polar groups such as (an epoxy group, CO$_2$H, OH, NH$_2$, SO$_3$M, OSO$_3$M, PO$_3$M$_2$, and/or OPO$_3$M$_2$, wherein M is hydrogen, an alkali metal or ammonium, and M may be the same or different when more than one M are present in one group) into the polymer molecule used as the binder. Preferably, the polar group is present in an amount of from 10$^{-6}$ to 10$^{-4}$ chemical equivalent per 1 g of the polymer.

The above-described polymer binders can be used alone or in combination and are often hardened by adding a conventional cross-linking agent such as an isocyanate compound.

The ester compound of the present invention can be applied to magnetic recording media using a binder comprising oligomers and monomers of acrylic esters which is hardened by irradiation.

The materials used as the non-magnetic support include polyesters such as polyethylene terephthalate, or polyethylene 2,6-naphthalate, polyolefins such as polyethylene or polypropylene, cellulose derivatives such as cellulose triacetate, and resins such as polycarbonate, polyimide or polyamide imide, and may be metalized by a metal such as aluminum if necessary.

The support generally has a thickness of from 3 to 100 μm, preferably from 3 to 20 μm as a magnetic tape, and preferably from 20 to 100 μm as a magnetic disk.

The amount of the total binders in the magnetic layers of the magnetic recording medium of this invention is generally from 10 to 100 parts by weight, preferably from 20 to 40 parts by weight, per 100 parts by weight of the ferromagnetic particles in the magnetic layer.

It is preferred to further include inorganic particles having a Mohs' hardness of 5 or higher in the magnetic layer of the magnetic recording medium of this invention.

The inorganic particles are not particularly limited provided that those particles have a Mohs' hardness of 5 or higher. These inorganic particles having Mohs' hardness of 5 or higher include $Al_2O_3$ (Mohs' hardness of 9), TiO (Mohs' hardness of 6), $TiO_2$ (Mohs' hardness of 6.5), $SiO_2$ (Mohs' hardness of 7), $SnO_2$ (Mohs' hardness of 6.5), $Cr_2O_3$ (Mohs' hardness of 9) and $\alpha$-$Fe_2O_3$ (Mohs' hardness of 5.5). These inorganic particles can be used alone or in combination.

The inorganic particles having a Mohs' hardness of 8 or higher are particularly preferred. When inorganic particles having a Mohs' hardness of 5 or lower are used, inorganic particles tend to drop off from the magnetic layer and hardly have an abrasive function for a head, head clogging tends to take place and running durability becomes poor.

The inorganic particles are generally present in an amount of from 0.1 to 20 parts by weight, preferably from 1 to 10 parts by weight, per 100 parts by weight of ferromagnetic particles in the magnetic layer.

In addition to the above-described inorganic particles, it is desirable to add carbon black (particularly carbon black having an average particle diameter of from 10 to 300 nm (nanometer: $10^{-9}$ m)) into the magnetic layer.

A method for preparing a magnetic recording medium of this invention will hereinafter be illustrated.

The ferromagnetic particles and binders, the above-described ester compound of this invention and, if necessary, filling materials and additives are mixed and kneaded together with a solvent to prepare a magnetic coating composition. The solvent use for mixing and kneading is that generally used for preparing a magnetic coating composition.

The manner of mixing and kneading is not particularly limited, and the order of adding each component is optionally determined.

In preparing a magnetic coating composition, conventional additives such as dispersing agents, antistatic agents or lubricating agents can be used in combination.

Examples of dispersing agents include fatty acids having from 12 to 22 carbon atoms, their salts and their esters, and the compounds thereof wherein the hydrogen atoms are unsubstituted or are partially or wholly substituted with fluorine atoms. Additional examples of dispersing agents include, e.g., amides of the above fatty acids, aliphatic amines, higher alcohols, polyalkyleneoxide alkylphosphates, alkylphosphates, alkylborates, sarcosinates, alkylether esters, trialkyl polyolefins, oxyquaternary ammonium salts and lecithin.

The dispersing agent is generally used in an amount of from 0.1 to 10 parts by weight per 100 parts by weight of ferromagnetic particles in the magnetic layer.

Examples of antistatic agents which can be used in the present invention include electroconductive fine particles such as carbon black or carbon black graft polymer; natural surface active agents such has saponin; nonionic surface active agents such as alkylene oxide agents, glycerine agents or glycidol agents; cationic surface active agents such as higher alkylamines, quaternary ammonium salts, salts of pyridine and other heterocyclic compounds, phosphonium compounds or sulphonium compounds; anionic surface active agents such as carboxylic acid, phosphoric acid, or compounds having an acid group such as a sulfuric acid ester or a phosphoric acid ester; and amphoteric surface active agents such as amino acids, aminosulfonic acids, sulfuric acid esters or phosphoric acid esters of aminoalcohols. When the above-described electroconductive fine particles are used as an antistatic agent, they are present in an amount of from 0.1 to 10 parts by weight per 100 parts by weight of ferromagnetic particles in the magnetic layer, and when these particles are used as a surface active agent, they are present in an amount of from 0.12 to 10 parts by weight per 100 parts by weight of ferromagnetic particles in the magnetic layer.

It should not be included that the above-described additives such as dispersing agents, antistatic agents or lubricating agents have functions and effects as restricted above, and dispersing agents, for example, may function as a lubricating agent or an antistatic agnet. Accordingly, it should be understood that the above classification of the additives due to their functions are not decisive. If additives having multifunctions are used, the additive amounts thereof should preferably be determined in light of their multiple effects.

The thus prepared magnetic coating composition is coated on the above-described non-magnetic support. The coating composition can be directly coated on a nonmagnetic support or coated thereon through an intermediate layer such as an adhesive layer. The intermediate layer referred to herein includes a single layer composed of a binder alone, or a composite layer containing non-magnetic fine particles such as carbon dispersed in a binder.

In the intermediate layer containing carbon black, binders used therein can be optionally selected from those binders used in the magnetic layer. The carbon black has a particle diameter of preferably from 10 to 50 nm (nanometer: $10^{-9}$ m), and the weight ratio of the binder: carbon black is preferably from 100:10 to 100:150. The intermediate layer has a thickness of preferably from 0.1 to 2 $\mu$m when the intermediate layer is simply an adhesive layer, and the intermediate layer has a thickness of preferably from 0.5 to 4 $\mu$m when it is a composite layer containing non-magnetic particles.

The same or different lubricating agents as those used in the magnetic layer may be added to the intermediate layer.

A method for dispersing the ferromagnetic particles in the binder and a method for coating a coating composition on a support are described in detail in JP-A-54-46011 and JP-A-54-21805.

The thus-prepared magnetic layer has a dry thickness of generally from about 0.5 to 10 $\mu$m, preferably from 0.7 to 6.0 $\mu$m.

When the magnetic recording medium is used in the form of a tape, the magnetic layer, after being coated on the non-magnetic support, is provided with magnetic orientation to orientate the ferromagnetic particles contained therein, and then dried. When the magnetic recording medium is used in the form of a disk, it is provided with non orientation treatment at the magnetic field to remove anisotropy of magnetic characteristics, and thereafter, if necessary, is provided with surface smoothing treatment.

Examples of the materials for forming the magnetic layer of the thin metal film magnetic recoding medium include a ferromagnetic metal, such as iron, cobalt and nickel, and a ferromagnetic alloy, such as Fe-Co, Fe-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W and Co-Ni-Re. The magnetic layer of the thin metal film magnetic recoding medium can be prepared by the methods including electroplating, nonelectrode plating, gas phase plating, spattering, vapor deposition and ion plating. The thickness of the magnetic layer is preferably from 0.02 to 2 $\mu m$, more preferably from 0.05 to 0.4 $\mu m$.

The magnetic layer of the thin metal film magnetic recoding medium may further contain other elements such as O, N, Cr, Ga, As, Sr, Zr, Nb, Mo, Rh, Pd, Sn, Sb, Te, Pm, Re, Os, Ir, Au, Hg, Pb and Bi.

The profile of the surface of the magnetic layer is not particularly limited, but when unevenness having a hight of from 10 to 1,000 nm is present on the surface of the magnetic layer, the running property and the durability of the medium are particularly improved.

The support of the thin metal film magnetic recoding medium is preferably polyethylene terephthalate, polyethylene naphthalate, polyimide, etc., and preferably has a thickness of from 4 to 50 $\mu m$. An undercoated layer may be provided on the support in order to improve the adhesiveness of the magnetic layer and the magnetic properties of the magnetic layer.

This invention is more specifically illustrated by the following Example, but is not to be construed as being limited thereto. In the Example, all parts are by weight.

EXAMPLE

A first coating composition (1) was coated on both surfaces of a polyethylene terephthalate film having a surface roughness Ra=0.028 $\mu m$ and having a thickness of 75 $\mu m$ to form a non-magnetic layer having a dry thickness of 1.8 $\mu m$, and further thereon a second coating composition (2) was coated to prepare a magnetic layer having a dry thickness of 0.6 $\mu m$.

(1) Preparation of the first coating composition (for forming a non-magnetic layer) (intermediate layer)

| Formulation | |
|---|---|
| Nitrocellulose | 12 parts |
| Polyurethane ("Crisvon 6119", produced by DAINIPPON INK AND CHEMICALS, INC.) | 6 parts |
| Electroconductive carbon black (average particle diameter 30 nm) | 5 parts |
| Oleyl stearate | 1 part |
| Solvent (methyl ehtyl ketone/ toluene/methyl/isobutyl ketone, mixing ratio: 2:2:1) | 180 parts |

The above composition was put in a ball mill, and sufficiently mixed to prepare a coating composition having a viscosity of 10 poise at 25° C. Then, 7 parts of polyisocyanate ("Urecoat B" produced by Higashi Nippon Paint Co., Ltd., #1 Clear for Mylar) was added to the composition and sufficiently mixed to prepare a coating composition for forming a non-magnetic layer (intermediate layer).

(2) Preparation of the second coating composition (for forming a magnetic layer)

| Formulation | |
|---|---|
| Co added $FeO_x$ particles (x = 1.4, average particle diameter 0.3 $\mu m$ × 0.03 $\mu m$) | 100 parts |
| Copolymer of vinyl chloride and vinyl acetate ("UMCH" produced by Union Carbide Co., Ltd.) | 13 parts |
| Polyurethane ("N-2304" produced by Nippon Polyurethane Co., Ltd.) | 4 parts |
| $Cr_2O_3$ (abrasive agent) | 5 parts |
| Carbon black ("Asahi #80" produced by Asahi Carbon Co., Ltd.) | 5 parts |
| Ester compound (shown in Table 1) | 5 parts |
| Oleic acid | 1 part |
| Myristic acid modified silicone | 1.5 parts |
| Solvent (methyl ethyl ketone/ toluene/methyl isobutyl ketone, Mixing weight ratio: 2:2:1) | 240 parts |

The above composition was put in a ball mill, sufficiently stirred and uniformly dispersed, and 7 parts of polyisocyanate ("Urecoate B" produced by Higashi Nippon Paint Co., Ltd., "#1 Clear" for Mylar) was added sufficiently mixed to prepare a coating composition for forming a magnetic layer.

The thus-coated film was provided with smoothing treatment using a calender (surface glossing device) to smooth the surface of the magnetic layer, and then the film was cut to form a circular flexible disk having a radius of 5.25 inches to serve as a sample.

The results of evaluation on the thus-prepared samples are shown in Table 1.

The methods for evaluation were as follows.

Durability

The sample was run on a disk drive ("FD135" made by NEC Corporation) at 360 rpm, and the same track was reproduced repeatedly. The durability was evaluated in terms of the total number of rotation until the level of the reproduced output was reduced to 80% of the initial level.

Tap durability

The sample was run on a disk drive ("FD135" made by NEC Corporation) at 360 rpm. The magnetic head was loaded on the sample disk, and then unloaded at the position where the sample disk was rotated for 180° from the position at which the head was loaded while checking the position of the sample disk by the index signals recorded on the sample disk. The above procedure was repeated at the same track, and the tap durability was evaluated in terms of the total number of rotation until the level of the reproduced output was reduced to 80% of the initial level.

Output

The sample was run on a disk drive ("FD135" made by NEC Corporation) at 360 rpm. The standard signals were recorded on the sample disk at the predetermined current, and the reproduced RF signals were measured by an RMS volt meter. The output was evaluated in terms of the relative value when the output of the Sample No. 1 was 0.

TABLE 1

| Sample No. | Lubricating Agent | Molecular weight | Additive amount (parts) | Durability at 60° C. 10000 passes | Durability at 5° C. 10000 passes | Tap durability 23° C. 10000 passes | Output (relative value) |
|---|---|---|---|---|---|---|---|
| 1 | Oleyl stearate | 534 | 10 | >5000 | >5000 | >20 | 100 |
| 2 | Oleyl stearate/butyl stearaate | 534 / 340 | 10 / 6 | >5000 | >5000 | 20 | 105 |
| 3 | Oleyl laurate | 450 | 1 | >5000 | >5000 | 20 | 100 |
| 4 | Undecylenyl isostearate | 436 | 12 | >5000 | >5000 | 20 | 100 |
| 5 | Oleyl behenate | 590 | 8 | >5000 | >5000 | 20 | 100 |
| 6 | Oleyl decanoate | 422 | 12 | 4000-5000 | >5000 | 20 | 100 |
| 7 | Oleyl caproate | 366 | 12 | 4000-5000 | >5000 | 20 | 100 |
| *8 | Oleyl valerate | 352 | 12 | 2000-3000 | 3000-4000 | 8.5 | 90 |
| *9 | Oleyl butylate | 338 | 12 | 1000-2000 | 3000-4000 | 2.5 | 90 |
| 10 | Decenyl stearate | 422 | 12 | 4000-5000 | >5000 | 20 | 100 |
| *11 | 3-hexenyl stearate | 366 | 12 | 2000-3000 | 2000-3000 | 10 | 100 |
| *12 | Allyl stearate | 324 | 12 | 1000-2000 | 2000-3000 | 1.5 | 100 |
| *13 | Vinyl stearate | 310 | 12 | <1000 | 2000-3000 | 1.5 | 100 |
| *14 | Stearyl stearate | 536 | 12 | 2000-3000 | <1000 | 12 | 100 |
| *15 | Isocetyl stearate | 508 | 12 | 2000-3000 | 1000-2000 | 12 | 100 |
| *16 | Isomyristyl stearate | 480 | 12 | 2000-3000 | 2000-3000 | 9 | 100 |
| *17 | 2-Ethylhexyl stearate | 396 | 12 | 1000-2000 | 2000-3000 | 6.5 | 100 |
| *18 | Oleyl oleate | 532 | 12 | 2000-3000 | 1000-2000 | 10 | 80 |
| *19 | Oleyl palmitoleiate | 504 | 12 | 2000-3000 | 1000-2000 | 10 | 90 |
| 20 | Oleyl 2-ethyl hexane | 394 | 12 | 4000-5000 | >5000 | 20 | 90 |
| *21 | Hexyl stearate | 368 | 12 | 2000-3000 | 2000-3000 | 2.5 | 100 |
| *22 | Butyl stearate | 340 | 12 | <1000 | 1000-2000 | 1.5 | 100 |
| 23 | Elaidyl stearate | 534 | 10 | >5000 | >5000 | >20 | 100 |
| 24 | Erucyl stearate | 590 | 8 | >5000 | >5000 | >20 | 100 |

*Comparative Example

From the above results, it is clear that Samples Nos. 1 to 7, 10, 20, 23 and 24, which are within the scope of the present invention exhibit excellent durability under harsh conditions of high temperatures and low temperatures, while maintaining the proper electromagnetic characteristics. Sample Nos. 8, 9, 11 to 19, 21 and 22, which are comparative examples of the conventional magnetic recording media, exhibit poor durability.

As shown above, in the magnetic recording medium of the present invention, stable running durability can be obtained under conditions of wide ranging temperatures, while good electromagnetic conversion characteristics are maintained. The tests show that these superior results are obtained due to the presence in or on the magnetic layer of an ester compound, which is obtained by condensing a saturated fatty acid having from 6 to 22 carbon atoms and an unsaturated alcohol having from 8 to 22 carbon atoms. The tests also show that this invention is even further improved when the ester compound of the present invention has a molecular weight of 430 or more.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having thereon an intermediate layer and a magnetic layer, in that order, wherein said intermediate layer contains a first ester compound obtained by condensing a saturated fatty acid having from 6 to 26 carbon atoms and an unsaturated alcohol having from 8 to 26 carbon atoms, and wherein a second ester compound obtained by condensing a saturated fatty acid having from 6 to 26 carbon atoms and an unsaturated alcohol having from 8 to 26 carbon atoms is present on or in said magnetic layer.

2. A magnetic recording medium as claimed in claim 1, wherein said second ester compound has a molecular weight of 430 or more.

3. A magnetic recording medium as claimed in claim 2, wherein said second ester compound has a molecular weight of 500 or more, and a melting point of 36° C. or less.

4. A magnetic recording medium as claimed in claim 3, wherein said second ester compound is selected from the group consisting of oleyl stearate and oleyl isostearate.

5. A magnetic recording medium as claimed in claim 1, wherein said magnetic layer comprises a binder, and ferromagnetic particles dispersed therein; said second ester compound is present in said magnetic layer in an amount of from 1 to 22 wt% based on the amount of said ferromagnetic particles; and said second ester compound has a molecular weight of 400 or less.

6. A magnetic recording medium as claimed in claim 1, wherein said magnetic layer comprises a binder and ferromagnetic particles dispersed therein; said second ester compound is present in said magnetic layer in an amount of from 1 to 16 wt% based on the amount of said ferromagnetic particles; and said second ester compound has a molecular weight of more than 400.

7. A magnetic recording medium as claimed in claim 1, wherein said first ester compound and said second ester compound are the same.

* * * * *